(12) United States Patent
Yu et al.

(10) Patent No.: US 11,608,032 B2
(45) Date of Patent: Mar. 21, 2023

(54) VEHICLE MONITORING APPARATUS

(71) Applicant: HYUNDAI MOBIS CO., LTD., Seoul (KR)

(72) Inventors: Han Seong Yu, Yongin-si (KR); Myeong Je Kim, Yongin-si (KR); Jung Sub Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/396,636

(22) Filed: Aug. 6, 2021

(65) Prior Publication Data

US 2022/0063565 A1 Mar. 3, 2022

(30) Foreign Application Priority Data

Aug. 25, 2020 (KR) .................. 10-2020-0107231

(51) Int. Cl.
| | | |
|---|---|---|
| *B60S 1/08* | (2006.01) | |
| *B60S 1/54* | (2006.01) | |
| *B60S 1/60* | (2006.01) | |
| *B60R 11/04* | (2006.01) | |
| *H04N 5/225* | (2006.01) | |
| *B60Q 1/00* | (2006.01) | |
| *B60R 11/00* | (2006.01) | |

(52) U.S. Cl.
CPC .......... *B60S 1/0848* (2013.01); *B60Q 1/0023* (2013.01); *B60R 11/04* (2013.01); *B60S 1/54* (2013.01); *B60S 1/603* (2013.01); *H04N 5/2252* (2013.01); *B60R 2011/004* (2013.01)

(58) Field of Classification Search
CPC .......... B60S 1/0848; B60S 1/54; B60S 1/603; B60Q 1/0023; B60R 11/04; B60R 2011/004; H04N 5/2252
USPC ........................................ 348/148
See application file for complete search history.

(56) References Cited

U.S. PATENT DOCUMENTS

| | | | | |
|---|---|---|---|---|
| 2005/0193732 | A1* | 9/2005 | LaRue | ...................... F02C 6/12 60/605.1 |
| 2007/0037484 | A1* | 2/2007 | Ohishi | ...................... B08B 7/02 451/6 |
| 2014/0104426 | A1* | 4/2014 | Boegel | ...................... B60R 1/10 348/148 |
| 2018/0086317 | A1* | 3/2018 | Shank | ........................ B08B 3/02 |
| 2019/0086773 | A1* | 3/2019 | Okamura | ............... G03B 17/08 |
| 2020/0108801 | A1* | 4/2020 | Frederick | ................ B60S 1/481 |
| 2020/0324738 | A1* | 10/2020 | Kubota | ..................... B60S 1/56 |

* cited by examiner

*Primary Examiner* — Joseph G Ustaris
*Assistant Examiner* — Matthew David Kim
(74) *Attorney, Agent, or Firm* — DLA Piper LLP (US)

(57) ABSTRACT

A vehicle monitoring apparatus including: a camera disposed in a vehicle lamp; a guide duct configured to guide outside air introduced into the vehicle; and a nozzle connected to the guide duct and configured to discharge the air to a front side of the camera, thereby improving stability and reliability.

19 Claims, 11 Drawing Sheets

VEHICLE MONITORING APPARATUS

CROSS-REFERENCE TO RELATED APPLICATION

This application claims priority to and the benefit of Korean Patent Application No. 10-2020-0107231 filed in the Korean Intellectual Property Office on Aug. 25, 2020, the entire contents of which are incorporated herein by reference.

TECHNICAL FIELD

The present disclosure relates to a vehicle monitoring apparatus, and more particularly, to a vehicle monitoring apparatus with improved stability and reliability.

BACKGROUND ART

In general, a vehicle is provided with various types of lamps having a lighting function and a signal function. The lighting function allows a driver to easily recognize objects positioned around the vehicle during the nighttime driving. The signal function informs drivers in other vehicles and pedestrians on the road of a traveling state of the host vehicle.

For example, the vehicle is provided with headlamps (or headlights) and fog lamps mainly used for the lighting function, and turn signal lamps, tail lamps, brake lamps, and side markers used for the signal function. The installation criteria and specifications of a vehicle monitoring apparatus are stipulated in the regulations to enable the vehicle monitoring apparatus to sufficiently exhibit the functions thereof.

As one of the vehicle monitoring apparatuses, the headlamp provides a low-beam pattern or a high-beam pattern to ensure a front visual field of the driver during the nighttime driving. The headlamp plays a significantly important role in safe driving.

Recently, various attempts have been made to implement safety driving at the time of driving the vehicle by mounting a camera in a vehicle lamp and enabling a driver to monitor a periphery of a vehicle through a screen based on images of the periphery of the vehicle (e.g., images of blind spots) which are captured by the camera.

Meanwhile, the quality of the images captured by the camera deteriorates if foreign substances such as moisture and dust exist on a front side of the camera. Therefore, the front side of the camera needs to be kept clean without moisture and dust to accurately capture the image of the periphery of the vehicle.

In the related art, however, it is difficult to accurately capture the image of the periphery of the vehicle due to interference (image distortion) caused by rainwater (water droplets) attached to a surface of the vehicle lamp (e.g., an outer surface of an outer lens) on a rainy day.

Therefore, recently, various studies have been conducted to acquire accurate image information by effectively removing rainwater attached to the front side of the camera, but the study results are still insufficient. Accordingly, there is a need to develop a technology to acquire accurate image information by effectively removing rainwater attached to the front side of the camera.

SUMMARY

The present disclosure has been made in an effort to provide a vehicle monitoring apparatus with improved stability and reliability.

The present disclosure has also been made in an effort to accurately capture an image of a periphery of a vehicle by effectively removing rainwater from a front side of a camera provided in a vehicle lamp using vehicle-induced wind (traveling wind).

The present disclosure has also been made in an effort to simplify a structure and a manufacturing process and improve spatial utilization and a degree of design freedom.

The present disclosure has also been made in an effort to minimize power consumption and effectively remove rainwater from a front side of a camera.

The objects to be achieved by the embodiments are not limited to the above-mentioned objects, but also include objects or effects that may be understood from the solutions or embodiments described below.

An embodiment of the present disclosure provides a vehicle monitoring apparatus including: a camera disposed in a vehicle lamp; a guide duct configured to guide outside air introduced into the vehicle; and a nozzle connected to the guide duct and configured to discharge the air to a front side of the camera.

This is to effectively remove rainwater from the front side of the camera and improve stability and reliability.

That is, the quality of the images captured by the camera disposed in the vehicle lamp deteriorates if foreign substances such as moisture and dust exist on a front side of the camera. Therefore, the front side of the camera needs to be kept clean without moisture and dust to allow the camera to accurately capture the image of the periphery of the vehicle.

In the related art, however, it is difficult to accurately capture the image of the periphery of the vehicle due to interference (image distortion) caused by rainwater (water droplets) attached to a surface of the vehicle lamp (e.g., an outer surface of an outer lens) on a rainy day.

In contrast, according to the embodiment of the present disclosure, the rainwater attached to the front side of the camera is removed by outside air (vehicle-induced wind generated while the vehicle travels) introduced into the vehicle. Therefore, it is possible to obtain an advantageous effect of effectively removing the rainwater from the front side of the camera and accurately capturing the image of the periphery of the vehicle.

Moreover, according to the embodiment of the present disclosure, the usage of a motor and pump for forcibly supplying air for removing the rainwater attached to the front side of the camera may be minimized. Therefore, it is possible to obtain an advantageous effect of simplifying a structure and a manufacturing process, reducing costs, and minimizing power consumption.

The structure of the vehicle lamp may be variously changed in accordance with required conditions and design specifications.

For example, the vehicle lamp may include: a light source; and an outer lens disposed in front of the light source and configured to define an external appearance, and the camera may be disposed inside the outer lens.

The nozzle may have various structures capable of discharging the air to the front side of the camera.

In particular, the nozzle may discharge the air from the outside of the outer lens to an outer surface of the outer lens that corresponds to the front side of the camera.

According to the exemplary embodiment of the present disclosure, at least a part of the guide duct may pass through an engine room in the vehicle, and the air may be heated by heat in the engine room while moving along the guide duct.

Since a part of the guide duct passes through the engine room in the vehicle as described above, the air, which is discharged to the surface of the outer lens through the guide duct, may be heated. Therefore, it is possible to obtain an advantageous effect of removing rainwater attached to the surface of the outer lens and drying the surface of the outer lens.

According to another exemplary embodiment of the present disclosure, at least a part of the guide duct may pass through an internal space of the vehicle lamp, and the air may be heated by heat in the vehicle lamp while moving along the guide duct.

Since a part of the guide duct passes through the internal space of the vehicle lamp as described above, the air, which is discharged to the surface of the outer lens through the guide duct, may be heated. Therefore, it is possible to obtain an advantageous effect of removing rainwater attached to the surface of the outer lens and drying the surface of the outer lens.

According to the exemplary embodiment of the present disclosure, the vehicle monitoring apparatus may include a venturi duct disposed between the guide duct and the nozzle.

The structure of the venturi duct may be variously changed in accordance with required conditions and design specifications. For example, the venturi duct may include: a first duct part connected to the guide duct and having a first cross-sectional area; and a second duct part having a second cross-sectional area smaller than the first cross-sectional area and including one end connected to the first duct part and the other end connected to the nozzle.

Since the venturi duct is disposed between the guide duct and the nozzle as described above, a discharge velocity of the air discharged to the surface of the outer lens may be increased. Therefore, it is possible to obtain an advantageous effect of further improving efficiency in removing rainwater attached to the surface of the outer lens.

Moreover, because a separate pump or motor for increasing the flow velocity of the air need not be provided, it is possible to obtain an advantageous effect of simplifying a structure and a manufacturing process and reducing costs.

According to the exemplary embodiment of the present disclosure, the vehicle monitoring apparatus may include a valve disposed in at least any one of the guide duct and the nozzle and configured to selectively adjust the amount of air to be discharged through the nozzle.

According to the exemplary embodiment of the present disclosure, the vehicle monitoring apparatus may include a detection sensor disposed in the vehicle lamp and configured to detect the rainwater on the front side of the camera, and a control unit configured to selectively open or close the valve based on a signal detected by the detection sensor.

As described above, the detection sensor may detect the rainwater on the front side of the camera, and the valve may be opened only when the rainwater is detected. Therefore, it is possible to obtain an advantageous effect of minimizing contamination of and damage to the outer lens caused by foreign substances introduced through the guide duct.

According to the exemplary embodiment of the present disclosure, the vehicle monitoring apparatus may include a movement unit configured to selectively move a position of an outlet end of the nozzle relative to the camera.

This is to improve efficiency in removing the rainwater by selectively changing the position of the outlet end of the nozzle.

In particular, the control unit may selectively move the position of the outlet end of the nozzle based on information on an image captured by the camera.

For example, the control unit may control the movement unit so that the outlet end of the nozzle is directed toward a target region in which moisture is attached among a plurality of visual information regions detected by the camera.

Since the outlet end of the nozzle is directed toward the target region in which the rainwater is attached among the plurality of visual information regions detected by the camera as described above, the air may be concentrated on the target region in which the rainwater is attached. Therefore, it is possible to obtain an advantageous effect of reducing the time required to remove the rainwater RW and further improving the efficiency in removing the rainwater.

The movement unit may have various structures capable of selectively moving the position of the outlet end of the nozzle.

For example, the movement unit may include: a first movement part configured to move the outlet end of the nozzle relative to the camera in a first direction; and a second movement part configured to move the outlet end of the nozzle relative to the camera in a second direction that intersects the first direction.

Since the position of the outlet end of the nozzle is moved in the first and second directions, which intersect each other, by the first and second movement parts as described above, the outlet end of the nozzle may be more accurately positioned toward the target region. Therefore, it is possible to obtain an advantageous effect of further improving the efficiency in removing the rainwater.

According to the exemplary embodiment of the present disclosure, the first movement part may include: a first base member; and a first movable member connected to the outlet end of the nozzle and configured to move relative to the first base member in the first direction.

According to the exemplary embodiment of the present disclosure, the second movement part may include: a second base member; and a second movable member connected to the first base member and configured to move relative to the second base member in the second direction.

According to the exemplary embodiment of the present disclosure, the vehicle monitoring apparatus may include a fan disposed in the guide duct and configured to force the air to flow.

Since the fan for forcing the air to flow is disposed in the guide duct as described above, it is possible to obtain an advantageous effect of improving the efficiency in drawing the air into the guide duct and increasing the amount of air to be introduced into the guide duct.

According to the exemplary embodiment of the present disclosure, the vehicle monitoring apparatus may include an air compressor disposed between the venturi duct and the nozzle and configured to compress the air.

As described above, the air compressor may be disposed between the venturi duct and the nozzle, such that the air guided along the guide duct is compressed by the air compressor and then discharged through the nozzle. Therefore, it is possible to obtain an advantageous effect of increasing a discharge force (discharge pressure) of the air to be discharged to the surface of the outer lens and improving the efficiency in removing the rainwater.

According to the exemplary embodiment of the present disclosure, the vehicle monitoring apparatus may include an ejector disposed at the outlet end of the nozzle, in which the ejector includes: a first inlet port into which the air is introduced; a second inlet port into which air at a periphery of the nozzle is introduced; and an outlet port through which the air and the peripheral air are mixed and discharged.

Since the ejector is disposed at the outlet end of the nozzle as described above, the flow rate and the flow velocity of the air to be discharged to the front side of the camera may be increased. Therefore, it is possible to obtain an advantageous effect of further improving the efficiency in removing the rainwater attached to the front side of the camera.

According to the exemplary embodiment of the present disclosure, the vehicle monitoring apparatus may include a rainwater guide groove provided in an outer surface of the outer lens that corresponds to the front side of the camera, in which the rainwater guide groove guides rainwater, which is attached to the outer surface of the outer lens, along an outer region in front of the camera.

Since the rainwater guide groove is provided along the outer region in front of the camera as described above, it is possible to obtain an advantageous effect of preventing the rainwater attached to the surface of the outer lens from flowing down to the front side of the camera.

In particular, a rainwater inflow line may be disposed above the rainwater guide groove, and a rainwater outflow line may be disposed below the rainwater guide groove.

As described above, the rainwater inflow line may be disposed above the rainwater guide groove and communicate with the rainwater guide groove. Therefore, it is possible to obtain an advantageous effect of effectively guiding the rainwater, which is attached to the surface of outer lens, into the rainwater guide groove from above the front side of the camera.

In addition, the rainwater outflow line may be disposed below the rainwater guide groove and communicate with the rainwater guide groove. Therefore, it is possible to obtain an advantageous effect of immediately discharging the rainwater, which is introduced into the rainwater guide groove, downward while preventing the rainwater from stagnating or overflowing.

DETAILED DESCRIPTION

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 11, a vehicle monitoring apparatus 10 according to an embodiment of the present disclosure includes: a camera 200 disposed in a vehicle lamp 100; a guide duct 310 configured to guide outside air introduced into a vehicle; and a nozzle 400 connected to the guide duct 310 and configured to discharge the air to a front side of the camera 200.

For reference, the vehicle lamp 100, which constitutes the vehicle monitoring apparatus 10 according to the embodiment of the present disclosure, may be mainly used for a lighting function (e.g., headlamps or fog lamps) or for a signal function (e.g., turn-signal lamps, tail lamps, brake lamps, or side markers). The present disclosure is not restricted or limited by the use of the vehicle lamp 100.

For example, the vehicle lamp 100 according to the embodiment of the present disclosure may be used as a headlamp of a vehicle 20 provided at each of front-left and front-right sides of the vehicle 20.

The vehicle lamp 100 may be variously changed in structure in accordance with required conditions and design specifications, and the present disclosure is not restricted or limited by the structure of the vehicle lamp 100.

Figure 1:
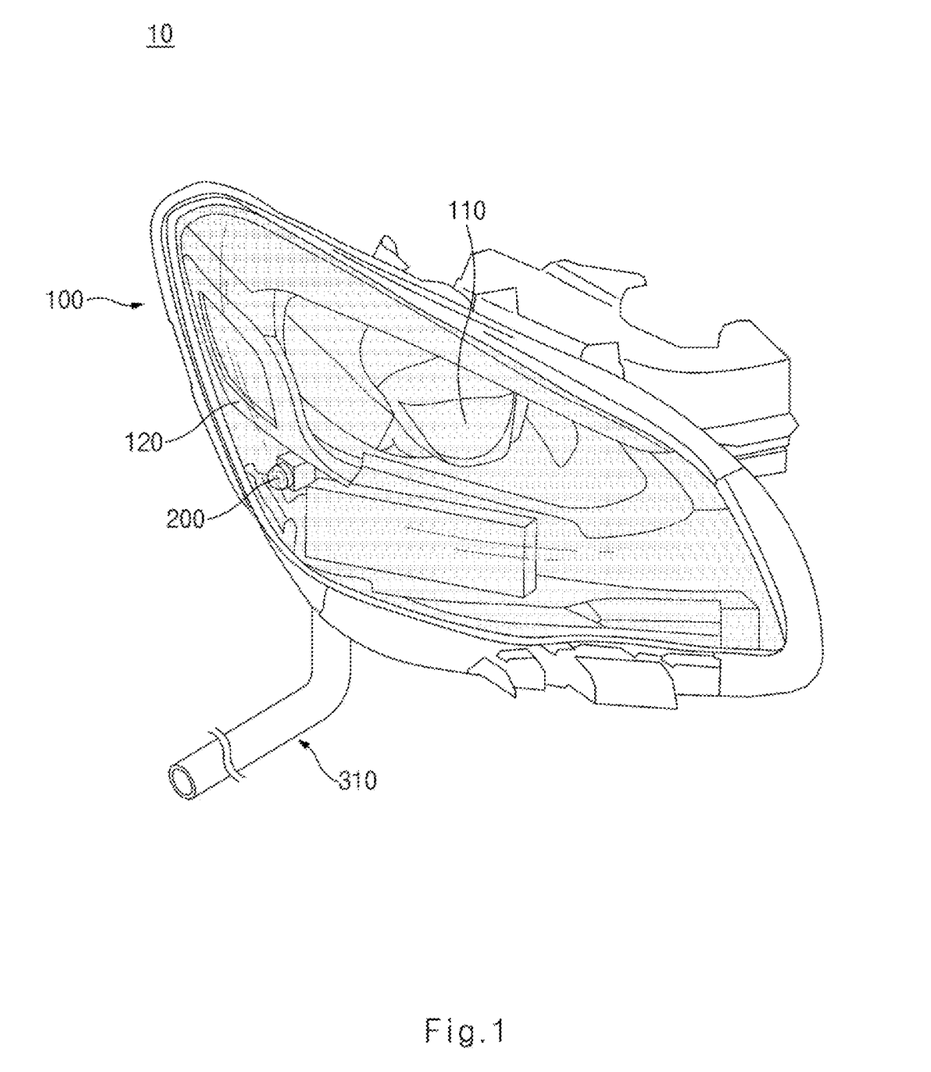
FIG. 1 is a view for explaining a vehicle monitoring apparatus according to an embodiment of the present disclosure.

For example, referring to FIG. 1, the vehicle lamp 100 may include a light source 110, and an outer lens 120 disposed in front of the light source 110 and configured to define an external appearance.

Various types of objects or devices capable of emitting light beams may be used as the light source 110. The present disclosure is not restricted or limited by the type and property of the light source 110.

For example, a light-emitting diode (LED), which is a semiconductor light-emitting element, may be used as the light source 110. In accordance with required conditions and design specifications, a plurality of LEDs may be used to emit the light beams with the same color or different colors. According to another embodiment of the present disclosure, a laser diode, a bulb, a halogen lamp, a xenon lamp (HID), or the like may be used as the light source.

The outer lens 120 is provided in front of the light source 110 and protects the light source 110 and components around the light source 110 from moisture, dust, and external impact and to define an external appearance.

The outer lens 120 may be made of a transparent or semi-transparent light transmissive material capable of transmitting the light. The present disclosure is not restricted or limited by the material and structure of the outer lens 120.

According to another embodiment of the present disclosure, an inner lens (e.g., an aspherical lens) or other optical members may be disposed between the light source and the outer lens and transmits the light, reflected by a reflector, to the outside. Alternatively, the light emitted from the light source may be reflected by a reflector (not illustrated) toward the outer lens.

The camera 200 is disposed in the vehicle lamp 100 and captures an image of a periphery of the vehicle 20 (e.g., an image of a lateral side of the vehicle). A driver may monitor the periphery of the vehicle 20 through a screen provided in the vehicle 20 based on the image of the periphery of the vehicle 20 captured by the camera 200.

Figure 3:
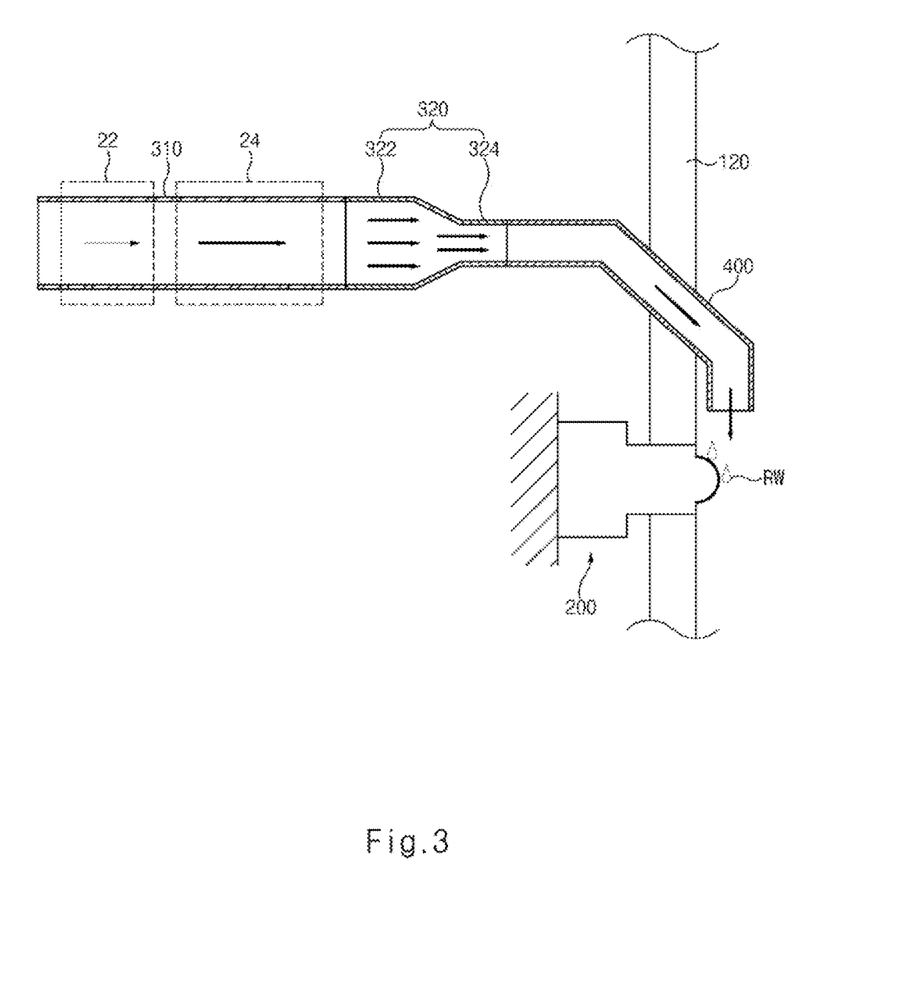
FIG. 3 is a view for explaining a nozzle of the vehicle monitoring apparatus according to the embodiment of the present disclosure.

For example, referring to FIGS. 1 and 3, the camera 200 may be mounted inside the outer lens 120. Hereinafter, an example will be described in which a lens part of the camera 200 protrudes from an outer surface of the outer lens 120. According to another embodiment of the present disclosure, the camera may be spaced apart from an inner surface of the outer lens 120.

Various types of cameras capable of capturing the image of the periphery of the vehicle 20 may be used as the camera 200. The present disclosure is not restricted or limited by the type and property of the camera 200. For example, a camera using a charge-coupled device (CCD) image sensor or a complementary metal-oxide-semiconductor (CMOS) image sensor may be used as the camera 200.

Figure 2:
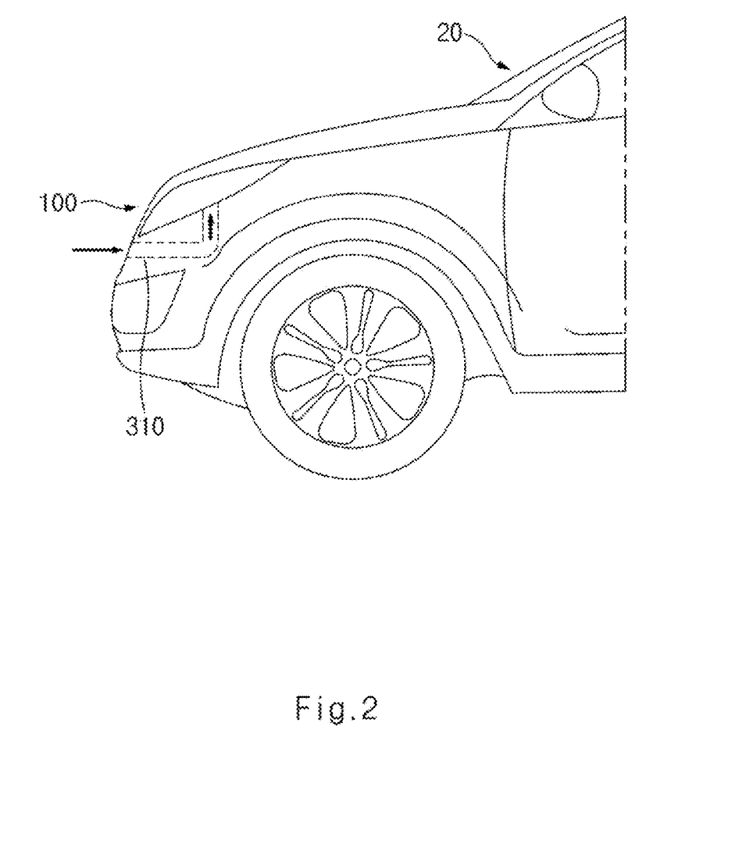
FIG. 2 is a view for explaining a guide duct of the vehicle monitoring apparatus according to the embodiment of the present disclosure.

The guide duct 310 guides the outside air, which is introduced into the vehicle, to the nozzle 400. The air, which is guided to the vehicle lamp 100 along the guide duct 310, may be discharged to the front side of the camera 200.

In this case, outside air, which is introduced into the vehicle, may be defined as vehicle-induced wind (traveling wind) introduced while the vehicle 20 travels.

The guide duct 310 may have various structures capable of guiding the outside air, introduced into the vehicle, to the vehicle lamp 100. The present disclosure is not restricted or limited by the structure of the guide duct 310.

For example, an inlet end of the guide duct 310 may be disposed in a front grill 22 (see FIG. 3) of the vehicle 20. The outside air, which is introduced through the inlet end of the guide duct, may be guided to the nozzle 400 (the front side of the camera) along the guide duct 310. According to another embodiment of the present disclosure, the inlet end of the guide duct may be disposed at a portion (e.g., a lower side of the vehicle lamp or a portion at which an inflow of rainwater and foreign substances may be minimized) which is closer to the vehicle lamp than is the front grill of the vehicle.

The nozzle 400 is configured to discharge the air, which is guided along the guide duct 310, to the front side of the camera 200.

The nozzle 400 may have various structures capable of discharging the air to the front side of the camera 200. The present disclosure is not restricted or limited by the type and structure of the nozzle 400.

In particular, the nozzle 400 may discharge the air from the outside of the outer lens 120 to an outer surface of the outer lens 120 that corresponds to the front side of the camera 200.

For example, a part of the nozzle 400 may be disposed in the outer lens 120, and the remaining part of the nozzle 400 (e.g., an outlet end of the nozzle) may penetrate the outer lens 120 and be disposed outside the outer lens 120. According to another embodiment of the present disclosure, the entire nozzle may be disposed outside the outer lens.

Various changes may be made to a discharge angle of the air discharged by the nozzle 400 and the number of discharge points at which the air is discharged by the nozzle 400 in accordance with required conditions and design specifications. The present disclosure is not restricted or limited by the discharge angle of the air and the number of discharge points.

Referring to FIG. 3, according to the exemplary embodiment of the present disclosure, at least a part of the guide duct 310 may pass through an engine room 24 in the vehicle 20. The air may be heated by heat in the engine room 24 (e.g., heat generated from an engine) while moving along the guide duct 310.

A path (a curved path) of the guide duct 310, which passes through the engine room 24, may be variously changed in accordance with required conditions and design specifications. In particular, the guide duct 310 may have a structure that does not change a layout of the engine room 24 in the related art.

Since a part of the guide duct 310 passes through the engine room 24 in the vehicle 20 as described above, the air, which is discharged to the surface of the outer lens 120 through the guide duct 310, may be heated. Therefore, it is possible to obtain an advantageous effect of removing rainwater RW attached to the surface of the outer lens 120 and drying the surface of the outer lens 120.

Figure 4:
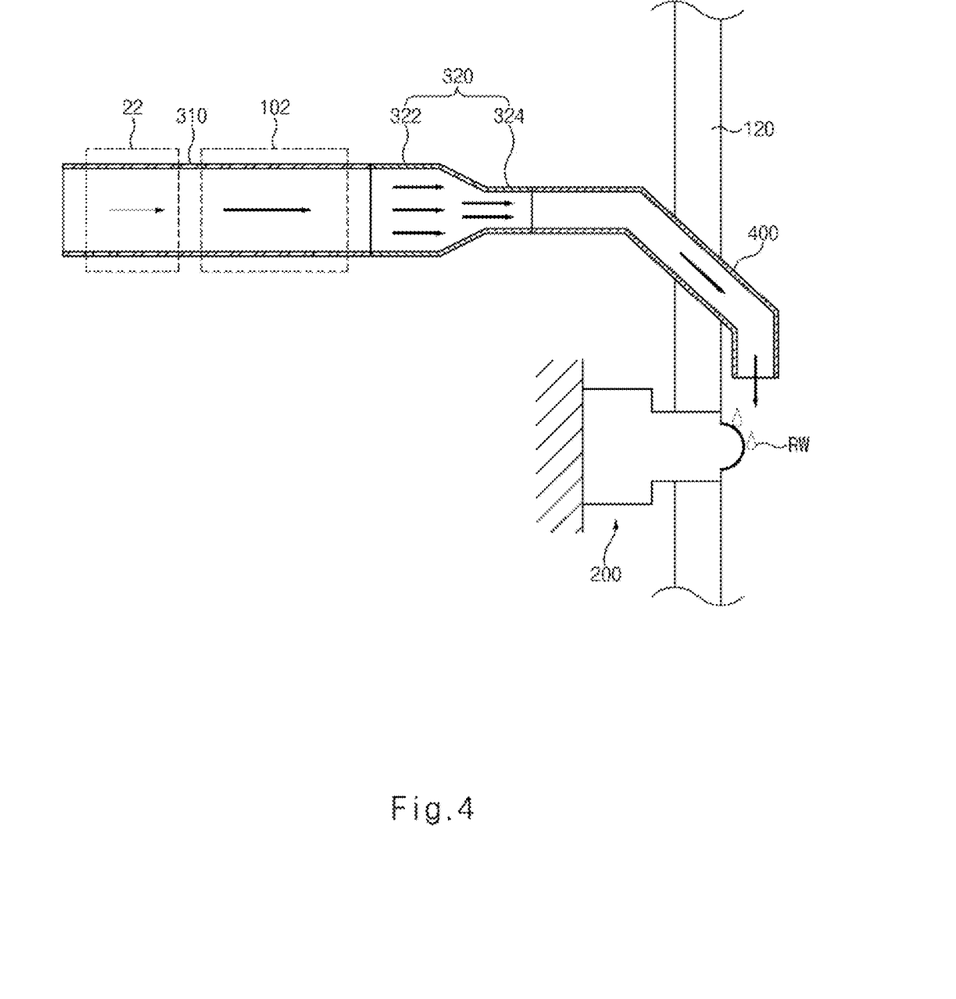
FIG. 4 is a view for explaining another example of the guide duct of the vehicle monitoring apparatus according to the embodiment of the present disclosure.

Referring to FIG. 4, according to another exemplary embodiment of the present disclosure, at least a part of the guide duct 310 may pass through an internal space 102 of the vehicle lamp 100. The air may be heated by heat in the vehicle lamp 100 (e.g., heat generated from the light source) while moving along the guide duct 310.

A path (a curved path) of the guide duct 310, which passes through the internal space 102 of the vehicle lamp 100, may be variously changed in accordance with required conditions and design specifications. In particular, the guide duct 310 may be disposed along an inner surface of a bezel (not illustrated) defined inside the outer lens 120 and configured to define an opening portion. Therefore, it is possible to minimize deterioration in design characteristics (deterioration in design characteristics caused by the exposure of the guide duct 310 to the outside) without blocking (interfering with) the light emitted from the light source 110.

Since a part of the guide duct 310 passes through the internal space 102 of the vehicle lamp 100 as described above, the air, which is discharged to the surface of the outer lens 120 through the guide duct 310, may be heated. Therefore, it is possible to obtain an advantageous effect of removing rainwater RW attached to the surface of the outer lens 120 and drying the surface of the outer lens 120.

In the embodiment of the present disclosure illustrated and described above, the example has been described in which the air is heated by the heat generated in the vehicle (e.g., the heat generated from the engine or the heat generated from the light source). However, according to another embodiment of the present disclosure, a separate heater may be disposed in the guide duct and selectively heat the air moving along the guide duct.

Referring back to FIG. 3, the vehicle monitoring apparatus 10 according to the exemplary embodiment of the present disclosure may include a venturi duct 320 disposed between the guide duct 310 and the nozzle 400.

Various venturi structures capable of increasing a movement speed (flow velocity) of the air guided along the guide duct 310 may be used as the venturi duct 320. The present disclosure is not restricted or limited by the type and structure of the venturi duct 320.

For example, the venturi duct 320 may include a first duct part 322 connected to the guide duct 310 and having a first cross-sectional area, and a second duct part 324 having a second cross-sectional area smaller than the first cross-sectional area and including one end connected to the first duct part 322 and the other end connected to the nozzle 400.

For example, the second duct part 324 may have a smaller diameter than the first duct part 322. The flow velocity of the air may be increased by the Venturi effect that occurs when the air introduced into the first duct part 322 passes through the second duct part 324 having a smaller diameter than the first duct part 322.

Since the venturi duct 320 is disposed between the guide duct 310 and the nozzle 400 as described above, a discharge velocity of the air discharged to the surface of the outer lens 120 may be increased. Therefore, it is possible to obtain an advantageous effect of further improving efficiency in removing rainwater RW attached to the surface of the outer lens 120.

Moreover, because a separate pump or motor for increasing the flow velocity of the air need not be provided, it is possible to obtain an advantageous effect of simplifying a structure and a manufacturing process and reducing costs.

Figure 5:
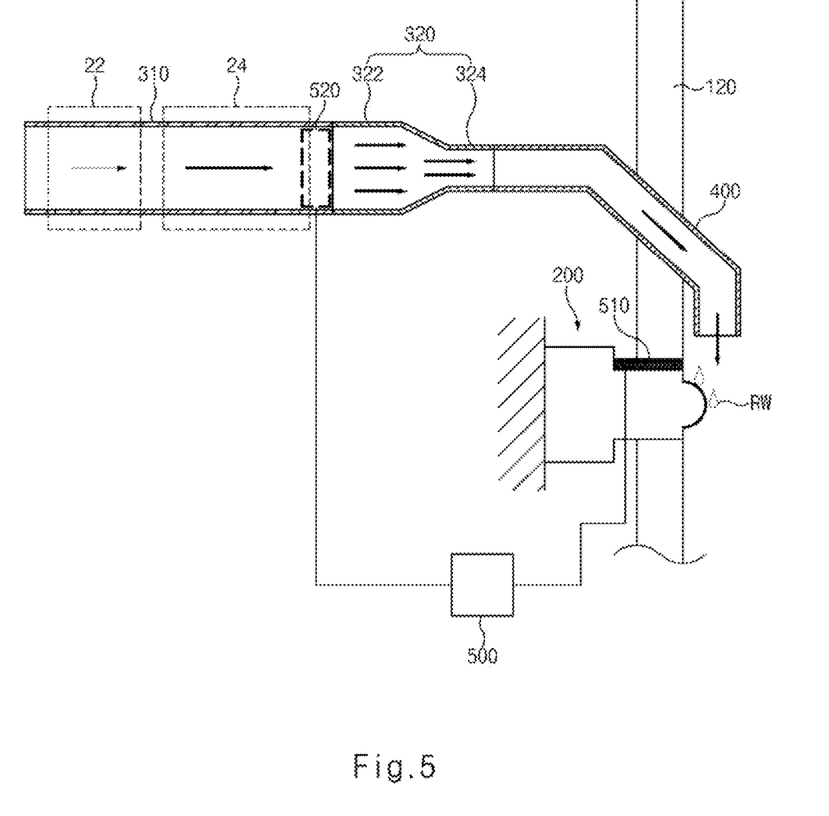
FIG. 5 is a view for explaining a detection sensor and a valve of the vehicle monitoring apparatus according to the embodiment of the present disclosure.

Referring to FIG. 5, according to the exemplary embodiment of the present disclosure, the vehicle monitoring apparatus 10 may include a valve 520 disposed in at least any one of the guide duct 310 and the nozzle 400 and configured to selectively adjust the amount of air to be discharged through the nozzle 400.

Hereinafter, an example will be described in which the valve 520 for adjusting the amount of air to be discharged is disposed in the guide duct 310. Alternatively, the valves may be disposed in the guide duct and the nozzle, respectively.

In the embodiment of the present disclosure, the configuration for adjusting the amount of air to be discharged through the nozzle 400 may include both a configuration for controlling a flow of air guided along the guide duct 310 in an on/off manner and a configuration for adjusting a flow rate by adjusting an opening rate (opening ratio).

Various valves capable of adjusting the amount of air to be discharged may be used as the valve 520. The present disclosure is not restricted or limited by the type and operational structure of the valve 520. For example, a typical solenoid valve may be used as the valve 520.

According to the exemplary embodiment of the present disclosure, the vehicle monitoring apparatus 10 may include a detection sensor 510 disposed in the vehicle lamp 100 and configured to detect the rainwater RW on the front side of the camera 200, and a control unit 500 configured to selectively open or close the valve 520 based on a signal detected by the detection sensor 510.

For example, the detection sensor 510 may be disposed inside the outer lens 120 and configured to detect the rainwater (water droplet) RW on the front side of the camera 200.

A typical rain sensor (e.g., an infrared ray sensor) capable of detecting the rainwater RW (e.g., detecting the intensity of rainfall and the amount of rainwater) in a front region of the camera 200 may be used as the detection sensor 510. The present disclosure is not restricted or limited by the type and detection method of the detection sensor 510.

The control unit 500 is configured to selectively open or close the valve 520 based on the signal detected by the detection sensor 510.

For example, when the detection sensor 510 does not detect the rainwater RW (e.g., on a fine day), the control unit 500 closes (turns off) the valve 520 to inhibit foreign substances (e.g., dust or insects) from being introduced through the guide duct 310.

In contrast, when the detection sensor 510 detects the rainwater RW (e.g., on a rainy day), the control unit 500 may open (turn on) the valve 520 or adjust the opening rate of the valve 520 based on the amount of rainwater RW detected by the detection sensor 510.

For reference, the control unit 500 may include a central processing unit (CPU) or a semiconductor device that processes instructions stored in a memory and/or a storage. Examples of the memory and the storage may include various types of volatile or non-volatile storage media. Examples of the memory may include a read only memory (ROM) and a random-access memory (RAM).

As described above, the detection sensor 510 may detect the rainwater RW on the front side of the camera 200, and the valve 520 may be opened only when the rainwater RW is detected. Therefore, it is possible to obtain an advantageous effect of minimizing contamination of and damage to the outer lens 120 caused by foreign substances introduced through the guide duct 310.

Figure 6:
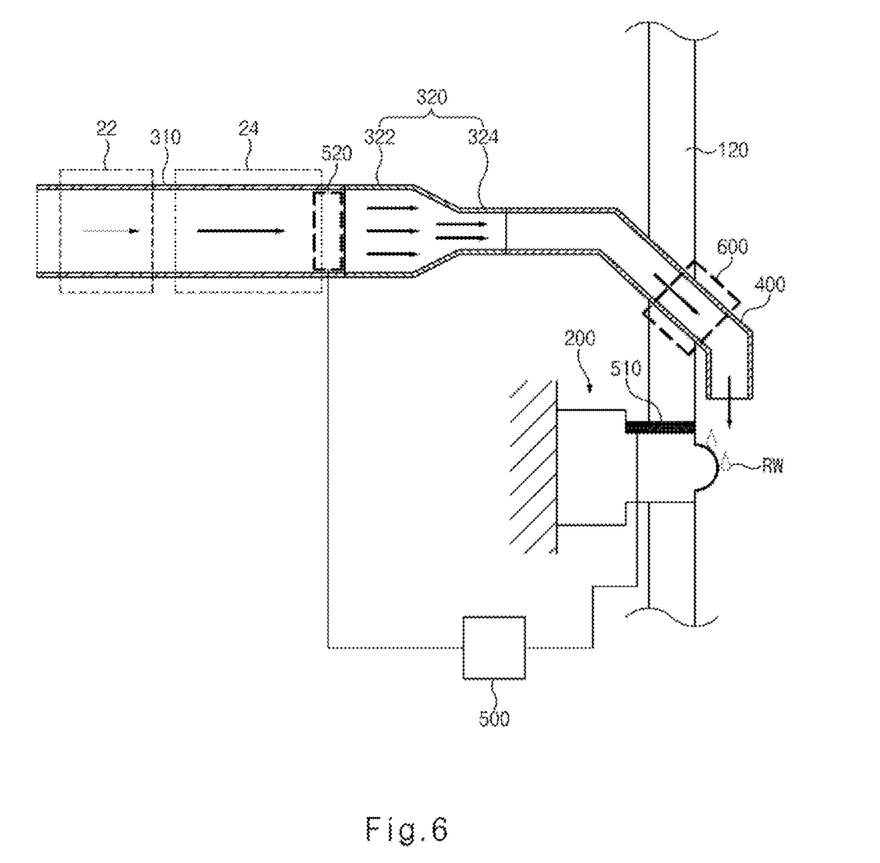
FIG. 6 is a view for explaining a control unit and a movement unit of the vehicle monitoring apparatus according to the embodiment of the present disclosure.
Figure 7:
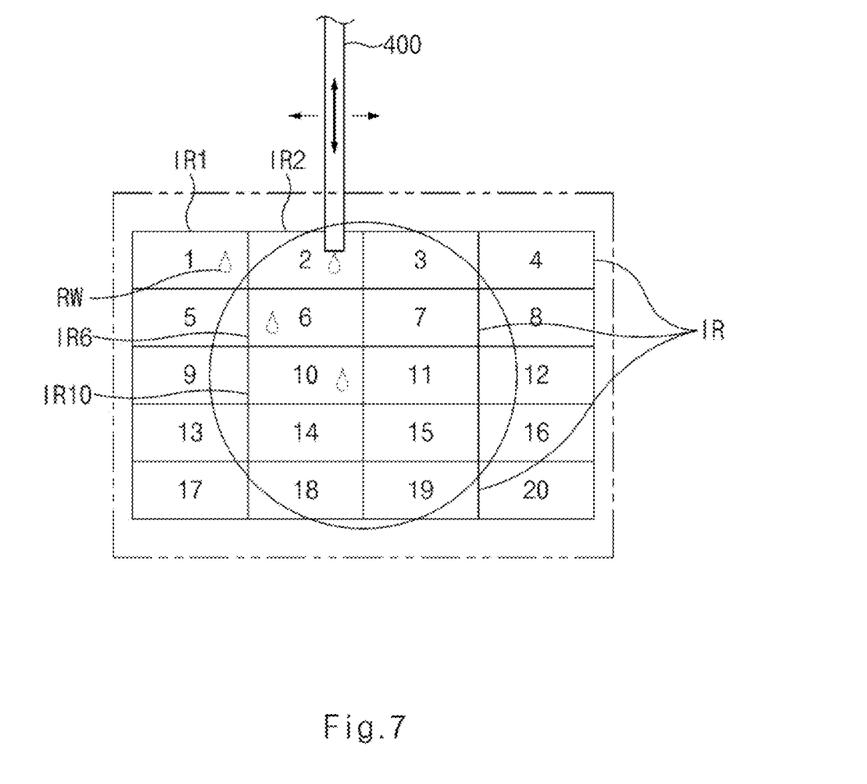
FIG. 7 is a view for explaining a visual information region captured by a camera of the vehicle monitoring apparatus according to the embodiment of the present disclosure.
Figure 8:
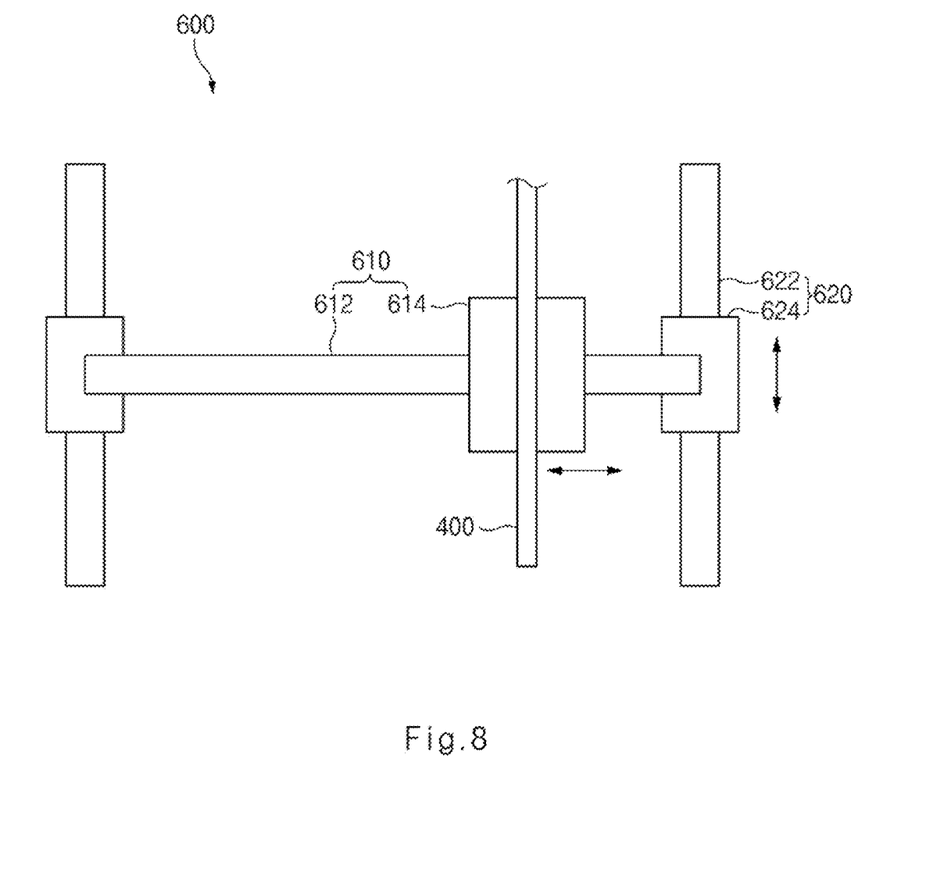
FIG. 8 is a view for explaining a first movement part and a second movement part of the vehicle monitoring apparatus according to the embodiment of the present disclosure.

Referring to FIGS. 6 to 8, according to the exemplary embodiment of the present disclosure, the vehicle monitoring apparatus 10 may include a movement unit 600 configured to selectively move a position of the outlet end of the nozzle 400 relative to the camera 200.

This is to improve efficiency in removing the rainwater RW by selectively changing the position of the outlet end of the nozzle 400.

In particular, the control unit 500 may selectively move the position of the outlet end of the nozzle 400 based on information on an image captured by the camera 200.

The process of adjusting the position of the outlet end of the nozzle 400 based on the information on the image captured by the camera 200 may be implemented in various ways in accordance with required conditions and design specifications.

For example, the control unit 500 may control the movement unit 600 so that the outlet end of the nozzle 400 is directed toward a target region in which moisture is attached among a plurality of visual information regions detected by the camera 200.

Since the outlet end of the nozzle 400 is directed toward the target region in which the rainwater RW is attached among the plurality of visual information regions detected by the camera 200 as described above, the air may be concentrated on the target region in which the rainwater RW is attached. Therefore, it is possible to obtain an advantageous effect of reducing the time required to remove the rainwater RW and further improving the efficiency in removing the rainwater RW.

For example, referring to FIG. 7, when it is detected that the rainwater RW is attached to particular target regions (e.g., a first visual information region IR1, a second visual information region IR2, a sixth visual information region IR6, and a tenth visual information region IR10) among twenty visual information regions IR defined based on the information on the image captured by the camera 200, the control unit 500 may control the movement unit 600 so that the outlet end of the nozzle 400 is directed toward the target regions.

The movement unit 600 may have various structures capable of selectively moving the position of the outlet end of the nozzle 400. The present disclosure is not restricted or limited by the structure of the movement unit 600.

For example, referring to FIG. 8, the movement unit 600 may include a first movement part 610 configured to move the outlet end of the nozzle 400 relative to the camera 200 in a first direction, and a second movement part 620 configured to move the outlet end of the nozzle 400 relative to the camera 200 in a second direction that intersects the first direction.

Since the position of the outlet end of the nozzle 400 is moved in the first and second directions, which intersect each other (e.g., orthogonal to each other), by the first and second movement parts 610 and 620 as described above, the outlet end of the nozzle 400 may be more accurately positioned toward the target region. Therefore, it is possible to obtain an advantageous effect of further improving the efficiency in removing the rainwater RW.

The first movement part 610 may have various structures capable of moving the outlet end of the nozzle 400 relative to the camera 200 in the first direction (e.g., in a leftward/rightward direction based on FIGS. 7 and 8).

For example, the first movement part 610 may include a first base member 612, and a first movable member 614 connected to the outlet end of the nozzle 400 and configured to move relative to the first base member 612 in the first direction.

The first base member 612 may be disposed in the vehicle lamp 100. The first movable member 614 may be coupled to the first base member 612 so as to be rectilinearly movable in the leftward/rightward direction.

In this case, the first movable member 614 may be rectilinearly moved by various well-known drive means. For example, the first movable member 614 may be rectilinearly moved relative to the first base member 612 by a typical air cylinder.

According to another embodiment of the present disclosure, permanent magnets (not illustrated) having N-poles and S-poles may be alternately disposed on the first base member, and a coil may be mounted on the first movable member. Therefore, the first movable member may be rectilinearly moved relative to the first base member by controlling the current applied to the coil on the basis of the principle of the linear motor. Alternatively, the first movable member may be rectilinearly moved by a lead screw, which is rotated by driving power from a drive motor, or other typical linear motion systems.

The second movement part 620 may have various structures capable of moving the outlet end of the nozzle 400 relative to the camera 200 in the second direction (e.g., in an upward/downward direction based on FIGS. 7 and 8).

For example, the second movement part 620 may include a second base member 622, and a second movable member 624 connected to the first base member 612 and configured to move relative to the second base member 622 in the second direction.

The second base member 622 may be disposed in the vehicle lamp 100 and intersect (e.g., be orthogonal to) the first base member 612. The second movable member 624 may be coupled to the second base member 622 so as to be rectilinearly movable in the upward/downward direction.

When the second movable member 624 rectilinearly moves relative to the second base member 622 in the second direction, the first base member 612 coupled to the second movable member 624 rectilinearly moves in the second direction together with the second movable member 624, such that the position of the outlet end of the nozzle 400 may be adjusted in the second direction.

In this case, the second movable member 624 may be rectilinearly moved by various well-known drive means. The present disclosure is not restricted or limited by the type and structure of the drive means.

Figure 9:
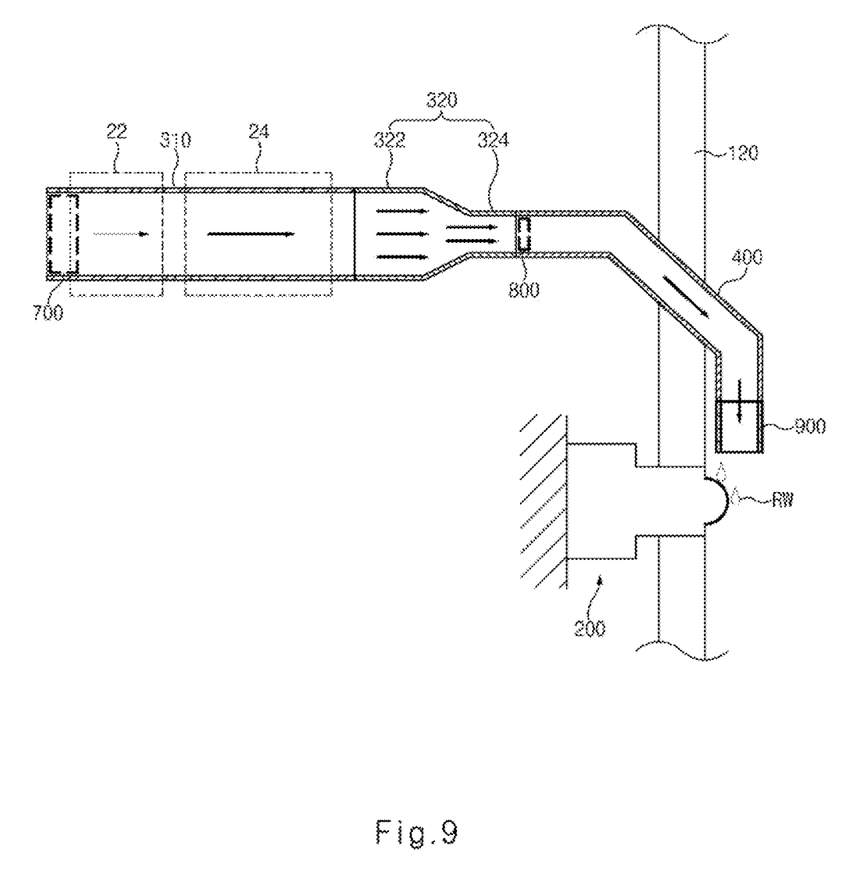
FIGS. 9 and 10 are views for explaining an ejector of the vehicle monitoring apparatus according to the embodiment of the present disclosure.

Referring to FIG. 9, according to the exemplary embodiment of the present disclosure, the vehicle monitoring apparatus 10 may include a fan 700 disposed in the guide duct 310 and configured to force the air to flow.

Since the fan 700 for forcing the air to flow is disposed in the guide duct 310 as described above, it is possible to obtain an advantageous effect of improving the efficiency in drawing the air into the guide duct 310 and increasing the amount of air to be introduced into the guide duct 310.

In particular, various fans may be used as the fan 700 in accordance with required conditions and design specifications. The present disclosure is not restricted or limited by the type and structure of the fan 700.

For example, an axial fan such as a propeller fan for generating an air flow in an axial direction (a direction of a rotation axis) may be used as the fan 700.

In addition, referring to FIG. 9, according to the exemplary embodiment of the present disclosure, the vehicle monitoring apparatus 10 may include an air compressor 800 disposed between the venturi duct 320 and the nozzle 400 and configured to compress the air.

As described above, the air compressor 800 may be disposed between the venturi duct 320 and the nozzle 400, such that the air guided along the guide duct 310 is compressed by the air compressor 800 and then discharged through the nozzle 400. Therefore, it is possible to obtain an advantageous effect of increasing a discharge force (discharge pressure) of the air to be discharged to the surface of the outer lens 120 and improving the efficiency in removing the rainwater RW.

A typical air compressor, a rotary air compressor, a centrifugal air compressor, or the like may be used as the air compressor 800. The present disclosure is not restricted or limited by the type and structure of the air compressor 800.

Referring to FIG. 9, according to the exemplary embodiment of the present disclosure, the vehicle monitoring apparatus 10 may include an ejector 900 disposed at the outlet end of the nozzle 400. The ejector 900 may include a first inlet port 910 into which air A1 is introduced, a second inlet port 920 into which air A2 at the periphery of the nozzle 400 is introduced, and an outlet port 930 through which the air A1 and the peripheral air A2 are mixed (A3) and discharged.

The ejector 900 may have various structures including the first inlet port 910, the second inlet port 920, and the outlet port and configured to mix (A3) the air A1 and the peripheral air A2 and discharge the mixed air. The present disclosure is not restricted or limited by the structure of the ejector 900.

Since the ejector 900 is disposed at the outlet end of the nozzle 400 as described above, the flow rate and the flow velocity of the air to be discharged to the front side of the camera 200 may be increased. Therefore, it is possible to obtain an advantageous effect of further improving the efficiency in removing the rainwater RW attached to the front side of the camera 200.

Figure 10:
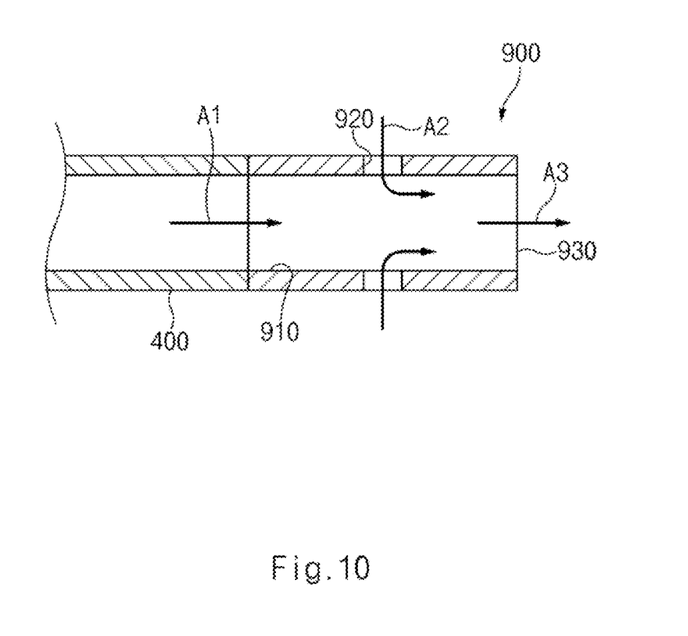
Figure 11:
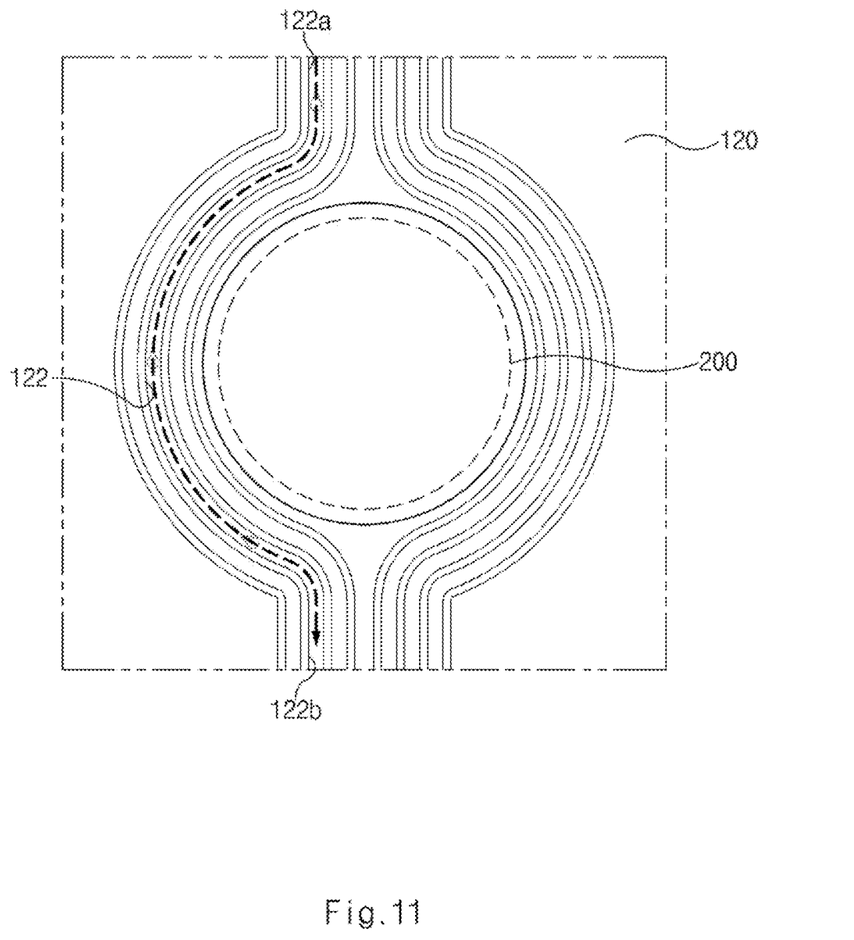
FIG. 11 is a view for explaining a rainwater guide groove of the vehicle monitoring apparatus according to the embodiment of the present disclosure.

Referring to FIGS. 10 and 11, according to the exemplary embodiment of the present disclosure, the vehicle monitoring apparatus 10 may include a rainwater guide groove 122. The rainwater guide groove 122 is provided in the outer surface of the outer lens 120 that corresponds to the front side of the camera 200. The rainwater guide groove 122 guides the rainwater RW, which is attached to the outer surface of the outer lens 120, along an outer region in front of the camera 200.

Since the rainwater guide groove 122 is provided along the outer region in front of the camera 200 as described above, it is possible to obtain an advantageous effect of preventing the rainwater RW attached to the surface of the outer lens 120 from flowing down to the front side of the camera 200.

The rainwater guide groove 122 may have various shapes and structures capable of guiding the rainwater RW, which is attached to the surface of the outer lens 120, to the outer region in front of the camera 200. The present disclosure is not restricted or limited by the shape and structure of the rainwater guide groove 122.

For example, the rainwater guide groove 122 may be provided in the form of a ring (or an arc) that surrounds the front side of the camera 200. The rainwater RW attached to the surface of the outer lens 120 may flow downward along the rainwater guide groove 122.

In particular, a rainwater inflow line 122a may be disposed above the rainwater guide groove 122 in a gravitational direction, and a rainwater outflow line 122b may be disposed below the rainwater guide groove 122.

As described above, the rainwater inflow line 122a may be disposed above the rainwater guide groove 122 and communicate with the rainwater guide groove 122. Therefore, it is possible to obtain an advantageous effect of effectively guiding the rainwater RW, which is attached to the surface of outer lens 120, to the rainwater guide groove 122 from above the front side of the camera 200.

In addition, the rainwater outflow line 122b may be disposed below the rainwater guide groove 122 and communicate with the rainwater guide groove 122. Therefore, it is possible to obtain an advantageous effect of immediately discharging the rainwater RW, which is introduced into the rainwater guide groove 122, downward while preventing the rainwater from stagnating or overflowing.

According to the embodiment of the present disclosure as described above, it is possible to obtain an advantageous effect of improving stability and reliability.

In particular, according to the embodiment of the present disclosure, it is possible to obtain an advantageous effect of effectively removing the rainwater from the front side of the camera disposed in the vehicle lamp using vehicle-induced wind (traveling wind), and accurately capturing the image of the periphery of the vehicle.

In addition, according to the embodiment of the present disclosure, it is possible to obtain an advantageous effect of simplifying the structure and the manufacturing process and improving the spatial utilization and the degree of design freedom.

In addition, according to the embodiment of the present disclosure, it is possible to obtain an advantageous effect of effectively removing the rainwater from the front side of the camera while minimizing power consumption.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A vehicle monitoring apparatus comprising:
   a camera disposed in a vehicle lamp;
   a guide duct configured to guide outside air introduced into the vehicle, wherein at least a part of the guide duct passes through an internal space of the vehicle lamp, and the air is heated by heat in the vehicle lamp while moving along the guide duct; and
   a nozzle connected to the guide duct and configured to discharge the air to a front side of the camera.

2. The vehicle monitoring apparatus of claim 1, wherein the vehicle lamp comprises:
   a light source; and
   an outer lens disposed in front of the light source and configured to define an external appearance,
   wherein the camera is disposed inside the outer lens.

3. The vehicle monitoring apparatus of claim 2, wherein the nozzle discharges the air from an outside of the outer lens to an outer surface of the outer lens that corresponds to the front side of the camera.

4. The vehicle monitoring apparatus of claim 1, wherein at least a part of the guide duct passes through an engine room in the vehicle, and the air is heated by heat in the engine room while moving along the guide duct.

5. The vehicle monitoring apparatus of claim 1, comprising:
   a venturi duct disposed between the guide duct and the nozzle.

6. The vehicle monitoring apparatus of claim 5, wherein the venturi duct comprises:
   a first duct part connected to the guide duct and having a first cross-sectional area; and
   a second duct part having a second cross-sectional area smaller than the first cross-sectional area and including one end connected to the first duct part and another end connected to the nozzle.

7. The vehicle monitoring apparatus of claim 5, comprising:
   an air compressor disposed between the venturi duct and the nozzle and configured to compress the air.

8. The vehicle monitoring apparatus of claim 1, comprising:

a valve disposed in at least any one of the guide duct and the nozzle and configured to selectively adjust an amount of air to be discharged through the nozzle.

9. The vehicle monitoring apparatus of claim 8, comprising:
a detection sensor disposed in the vehicle lamp and configured to detect rainwater on the front side of the camera; and
a control unit configured to selectively open or close the valve based on a signal detected by the detection sensor.

10. The vehicle monitoring apparatus of claim 9, comprising:
a movement unit configured to selectively move a position of an outlet end of the nozzle relative to the camera.

11. The vehicle monitoring apparatus of claim 10, wherein the control unit selectively moves the position of the outlet end of the nozzle based on information on an image captured by the camera.

12. The vehicle monitoring apparatus of claim 11, wherein the control unit controls the movement unit so that the outlet end of the nozzle is directed toward a target region in which rainwater is attached among a plurality of visual information regions captured by the camera.

13. The vehicle monitoring apparatus of claim 10, wherein the movement unit comprises:
a first movement part configured to move the outlet end of the nozzle relative to the camera in a first direction; and
a second movement part configured to move the outlet end of the nozzle relative to the camera in a second direction that intersects the first direction.

14. The vehicle monitoring apparatus of claim 13, wherein the first movement part comprises:
a first base member; and
a first movable member connected to the outlet end of the nozzle and configured to move relative to the first base member in the first direction.

15. The vehicle monitoring apparatus of claim 14, wherein the second movement part comprises:
a second base member; and
a second movable member connected to the first base member and configured to move relative to the second base member in the second direction.

16. The vehicle monitoring apparatus of claim 1, comprising:
a fan disposed in the guide duct and configured to force the air to flow.

17. The vehicle monitoring apparatus of claim 1, comprising:
an ejector disposed at an outlet end of the nozzle,
wherein the ejector comprises:
a first inlet port into which the air is introduced;
a second inlet port into which air at a periphery of the nozzle is introduced; and
an outlet port through which the air and the air at the periphery of the nozzle are mixed and discharged.

18. The vehicle monitoring apparatus of claim 2, comprising:
a rainwater guide groove provided in an outer surface of the outer lens that corresponds to the front side of the camera,
wherein the rainwater guide groove guides rainwater, which is attached to the outer surface of the outer lens, along an outer region in front of the camera.

19. The vehicle monitoring apparatus of claim 18, wherein a rainwater inflow line is disposed above the rainwater guide groove, and a rainwater outflow line is disposed below the rainwater guide groove.

* * * * *